Nov. 20, 1962    P. V. NAPLES    3,064,476
SOLID DIFFERENTIAL EXPANSION TEMPERATURE SENSOR
Filed Nov. 4, 1960
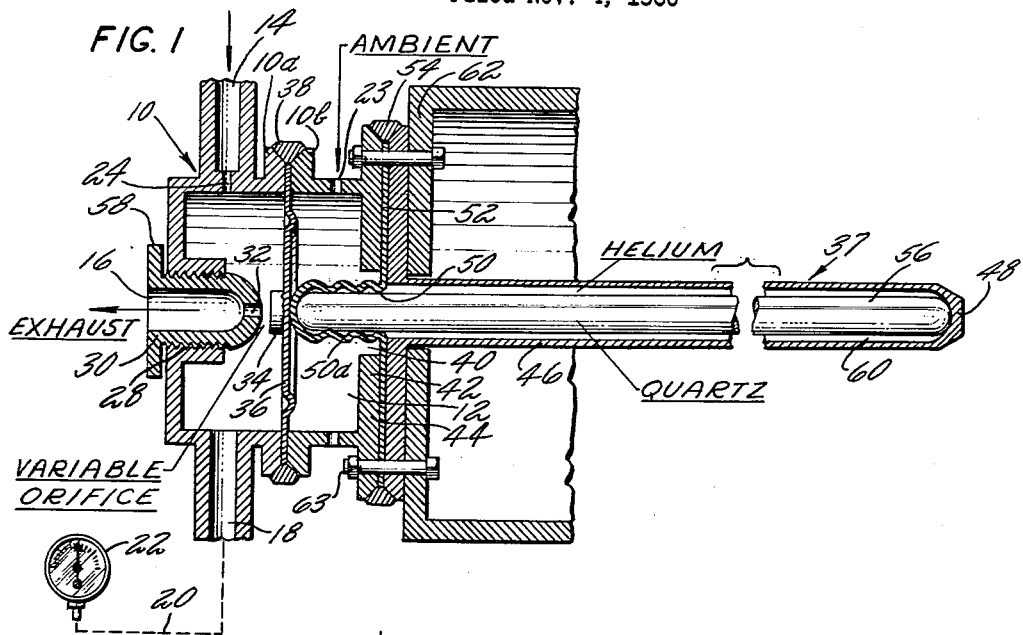
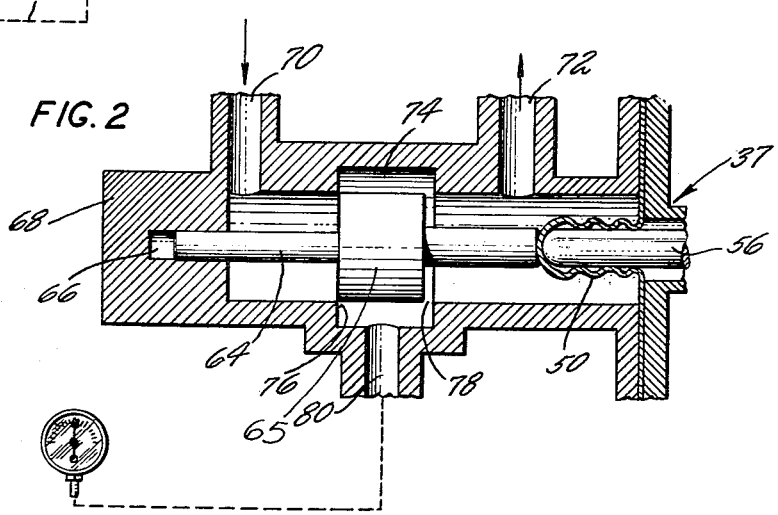
*INVENTOR*
*PHILIP V. NAPLES*
BY M. B. Tasker
*ATTORNEY*

3,064,476
SOLID DIFFERENTIAL EXPANSION
TEMPERATURE SENSOR
Philip V. Naples, Newington, Conn., assignor to United Aircraft Corporation, East Hartford, Conn., a corporation of Delaware
Filed Nov. 4, 1960, Ser. No. 67,383
12 Claims. (Cl. 73—363)

This invention relates to temperature sensors and particularly to sensors designed for liquid-metal applications involving both high temperatures and a corrosive environment.

A primary object of this invention is to provide a differential, expansion-type sensor for measuring liquid-metal temperatures which uses air as the working fluid.

Another object of this invention is to provide a solid, differential, temperature sensor of this type.

A further object of this invention is to provide a temperature sensor which uses the differential expansion of quartz and stainless steel for moving the orifice-controlling member to vary the pressure of a moving stream of air, the pressure of which is measured to give an indication of temperature.

A still further object is generally to improve the construction and operation of temperature sensors.

These and other objects and advantages of the invention will be evident or will be pointed out hereinafter in connection with the detailed description of two embodiments of the invention shown in the accompanying drawing. In this drawing:

FIG. 1 is a longitudinal sectional view through a temperature sensor embodying the preferred form of the invention, partly broken away to facilitate illustration; and FIG. 2 is a similar view showing a modified form of the invention.

FIG. 1 shows a housing 10 forming a chamber 12, having fluid-inlet and outlet passageways 14 and 16, respectively, for a stream of air which is introduced at 14 under constant pressure. A third passageway 18 communicates with chamber 12 and is connected through a conduit 20 with a pressure-responsive indicating device 22 which is calibrated in terms of temperature. A fixed, restricted orifice 24 is provided in the inlet passageway 14. The fluid-outlet passageway 16 is threaded at 28 to receive a sleeve or thimble 30 in the bottom of which a somewhat larger orifice 32 is provided. This orifice 32 is varied by a movable member 34 which is movable axially of the orifice 32 by temperature-expansive means generally indicated at 37. The movable member 34, as herein shown, is carried by a flexible diaphragm 36 which is mounted in the housing 10. Herein, the housing 10 is made in two parts, 10a and 10b, with the diaphragm mounted between them. The housing parts are then connected by a peripheral weld 38. Diaphragm 36 thus divides the chamber 12 into two parts, the left-hand chamber containing air under pressure, which in this case is the working fluid, the pressure of which is measured by the indicator 22. The right-hand chamber is vented to atmosphere through a series of passages 23.

The right-hand chamber of housing 10 has a large axial opening 40 in the end wall 42 thereof. This opening is closed by an external flange 44 of an axial tube 46. The tube is open at its flanged end and thus is in communication with the right-hand housing chamber but is closed at its extended end 48. The open, flanged end of tube 46 is closed by a resilient bellows 50, which has a peripheral flange 52 received between the housing wall 42 and the flange 44. The housing wall 42 and the flange 44 are permanently connected by weld 54, thus forming a closure for the opening in the right-hand housing chamber as well as a closure for the left-hand end of tube 46.

The bellows 50 has a corrugated expansible portion 50a which extends axially into the right-hand housing chamber and terminates in contact with the back of diaphragm 36. Inside the axially aligned tube 46 and bellows portion 50a is a quartz rod 56. This rod engages the closed end 48 of the tube at its extended end and engages the end of the bellows portion 50a at its other end, the length of the rod being such as to expand the bellows so as to position the latter in pressure engagement with the back of diaphragm 36.

Orifice 32 can be adjusted axially toward and away from the diaphragm-carried member 34 by rotating the thimble 30 relative to the housing in its threaded connection 28 and, to this end, the thimble is provided with a hexagonal flange 58 exterior of the housing.

Rod 56 is somewhat smaller in diameter than the inside bore of tube 46, leaving an annular space 60 between the rod and the tube wall into which an inert gas such as helium is introduced and in which it is sealed.

The sensor is mounted on a wall 62 of the liquid-metal-containing vessel in the usual manner by bolts 63, with the tube 46 projecting into the liquid-metal body as is customary with probes of this type.

In the operation of this form of the invention, air is introduced at 14 under constant pressure, and flows through the restricted orifice 24 and the variable orifice formed by the movable member 34 and the outlet orifice 32, and thence out the fluid-exhaust passageway 16 through the thimble 30. Depending upon the position of the movable member 34 relative to the thimble 30, a fluid pressure will be maintained in the left-hand housing chamber which will be indicated as temperature on the indicator 22. Quartz has a lower coefficient of thermal expansion than stainless steel. The thermal expansion of both materials is a function of temperature. The differential expansion of these two materials is then a measure of the temperature of the liquid metal in which this temperature-responsive means is immersed. As the temperature in the liquid metal changes, the left-hand end of quartz rod 56 will vary its position axially and cause the diaphragm 36 to move. Thus, if the temperature of the liquid metal increases, the expansible means 37 will withdraw the quartz rod and the bellows 50 and diaphragm 36 will move to the right, as viewed in FIG. 1, moving member 34 away from the orifice 32 in the thimble and increasing the flow of air through this orifice 32. Consequently, the pressure between the fixed orifice 24 and the variable orifice 32 will decrease, and this decrease in pressure will be shown on indicator 22 as a function of measured temperature. Similarly, a decrease in liquid-metal temperature will result in a contraction of assembly 37 and a decrease in the airflow through orifice 32, increasing the pressure in the left-hand housing chamber which will be shown as a decrease of temperature on the indicator 22. As the quartz rod moves to the right upon temperature increase, the resilient portion 50a of bellows 50 contracts, following the rod, and the flexible diaphragm 36, which has been moved to the left out of its normal plane, follows the bellows 50. Thus, rod 56, bellows 50 and diaphragm 36 always remain in axial-pressure engagement. It will be understood that the movement of member 34 in either direction is the resultant, or differential, of the expansion of the stainless-steel tube 46 and the quartz rod 56.

The modification shown in FIG. 2 utilizes the same temperature-responsive means 37, including the quartz rod 56 and the bellows 50. Instead of having a movable member 34 carried by a diaphragm, in this form of the invention the movable member comprises a piston 65 and a rod 64 piloted at 66 in a housing 68 at one end and engaged by the bellows 50 at its other end. The housing is provided with fluid-inlet and fluid-outlet passages 70 and 72, respectively, and the orifices are provided by an annular enlargement 74 in the piston chamber which, with the piston, forms spaced, annular orifices 76 and 78. The annular housing 68 in the vicinity of enlargement 74 between orifices 76 and 78 is provided with a passageway 80 which communicates with the indicator 22, as in FIG. 1.

In this modified form of the invention, as the temperature of the liquid metal decreases and the quartz rod 56 moves the piston 65 to the left in FIG. 2, the orifice 76 will have its area decreased and the orifice 78 will have its area increased, resulting in a reduction in pressure in the enlargement 74 between the orifices. When the liquid-metal temperature increases, the rod 56 will allow resilient bellows 50 to contract. The pressure of the air coming in at 70 will cause the piston and piston rod to follow the bellows 50, thus increasing the annular-orifice area at 76 and decreasing the area at 78, with the result that the pressure measured by indicator 22 will increase.

It will thus be evident that in either form of the invention the pressure of the fluid in the space between the two orifices is measured as a function of temperature of the liquid metal. It should be noted that in the form shown in FIG. 1, if the temperature markings on indicator 22 read counterclockwise the pointer moves clockwise as the pressure between orifices 24 and 32 increases, whereas in the form shown in FIG. 2, if the markings read clockwise the pointer will move clockwise upon increase in the temperature of the liquid metal.

As a result of this invention, a solid, differential-expansion, temperature sensor has been provided which is compact, rugged, and reliable in operation. Further, the sensor can use air as a working fluid to measure liquid-metal temperatures and meets the accuracy and time of response requirements essential in liquid-metal, heat-transfer systems.

While only two embodiments of the invention have been shown, it will be understood that numerous changes may be made in the construction and arrangements of the parts without exceeding the scope of the invention as defined by the following claims.

I claim:

1. In a temperature sensor, a housing forming a chamber, temperature-responsive means extended into said chamber including a tube and a quartz rod within said tube, said tube comprising a tubular member of stainless steel open at one end and an axially aligned flexible bellows open at one end, said tubular member and said bellows having their open ends secured together and to said housing in fluid-tight abutting relation and said rod having its opposite ends abutting the closed ends of said bellows and said tubular member, said housing having a constant pressure fluid inlet and a fluid outlet, an orifice adjacent said fluid inlet, an orifice adjacent said fluid outlet, at least one of said orifices being varied by the expansion and contraction of said temperature-responsive means to vary the pressure in said chamber, and temperature-indicating means responsive to pressure changes in said chamber.

2. A temperature sensor as defined in claim 1 in which the internal diameter of the tube is greater than the external diameter of the quartz rod, providing a space therebetween, and an inert gas in said space.

3. In a temperature sensor, a housing enclosing a chamber for the working fluid, fluid-inlet and fluid-outlet connections to said chamber, an inlet orifice adjacent said fluid inlet, an outlet orifice adjacent said fluid outlet, means for varying at least one of said orifices to vary the pressure in the chamber between said orifices, a pressure-responsive temperature indicator having a fluid connection to said chamber between said orifices, and a solid differential-expansion temperature-responsive assembly carried by said housing for controlling said orifice-varying means comprising a stainless-steel tube open at one end, an expansible bellows open at one end, said tube and bellows being connected together in axial alignment with their open ends in fluid-tight abutting relation, and a quartz rod in said tube having its opposite ends abutting the closed ends of said bellows and said tube with said bellows initially partly expanded.

4. A temperature sensor as defined in claim 3 in which a body of inert gas is provided in said tube and bellows surrounding said quartz rod.

5. In a temperature sensor, a housing forming a chamber for a working fluid, fluid-inlet and fluid-outlet passageways in said housing, inlet and outlet orifices in said chamber, a movable member for varying at least one of said orifices as a function of temperature, temperature-indicating means responsive to the pressure in said chamber between said orifices, and means for moving said member in response to temperature changes external of said housing comprising a stainless-steel tube open at one end and closed at its other end, said tube having its open end fixed in a fluid-tight manner about an opening in a wall of said chamber, a flexible bellows closed at one end and having its open end secured in a fluid-tight manner over the open end of said tube, a quartz rod in said tube and bellows having one end engaging the closed end of said tube and its other end engaging the closed end of said bellows, and a body of inert gas in said tube and bellows surrounding said quartz rod.

6. In a temperature sensor, a housing forming a chamber, one wall of said housing having an opening therein, a stainless-steel tube open at one end and closed at its other end having its open end secured to said housing wall in a fluid-tight manner about said opening externally of said housing, a flexible bellows open at one end and closed at the other end having its open end fixed to said housing wall about said opening internally of said housing, said bellows and said tube being in axial alignment, fluid-inlet and outlet passageways in said housing, inlet and outlet orifices in said housing, at least one of which is variable, a fluid passageway in said housing communicating with the space between said orifices, means in communication with said space through said last-mentioned passageway for indicating temperature in response to variations in pressure in said space, an orifice-varying member in said chamber abutting the closed end of said bellows, a quartz rod located in said tube and in said bellows coaxial therewith having one of its ends abutting the closed end of said bellows and its other end abutting the closed end of said tube, and a body of inert gas in said tube and bellows.

7. In a temperature sensor, a housing, a flexible diaphragm supported by said housing dividing the interior of the latter into first and second chambers, inlet and outlet passageways in said housing communicating with said first chamber, inlet and outlet orifice means associated with said inlet and outlet passageways, one of said orifice means being adjacent said diaphragm, said housing having an opening in one wall thereof into said second chamber, an expansible bellows in said second chamber having a closed end thereof abutting said diaphragm and having its other and open end secured in a fluid-tight manner about said opening, and temperature-responsive means for flexing said diaphragm to control said adjacent orifice including a stainless-steel tube external of said housing having one of its ends open and the other of its ends closed, an external flange on its open end secured in a fluid-tight manner to said housing about said opening therein with said tube in axial alignment with said bellows, and a quartz rod in said tube and bellows having one of its ends abutting the closed end of said tube and the other of its ends abutting the closed end of said bellows, and a body of inert gas in said tube and bellows surrounding said rod.

8. In a temperature sensor; a housing forming a chamber for the working fluid, a fluid inlet in said housing having a fixed orifice therein, a fluid outlet in said housing having a variable orifice therein, pressure-responsive indicating means having fluid communication with said chamber, and temperature-responsive means projecting into said chamber for varying said variable orifice in response to changes in temperature external of said housing, said last-mentioned means including a stainless-steel tube carried by said housing externally thereof, an expansible bellows carried by said housing internally thereof, said tube and said bellows being disposed in axial alignment in fluid communication with each other at their proximate ends, said bellows and said tube being closed at their remote ends, a quartz rod in said bellows and tube having its opposite ends abutting the closed ends of said bellows and said tube, and a body of helium gas in said bellows and tube surrounding said rod.

9. A temperature sensor in accordance with claim 8 in which the variable orifice is formed in a thimble which is screw-threaded into an opening in said housing axially aligned with said bellows and said tube, whereby said orifice can be adjusted toward and from said temperature-responsive means.

10. A temperature sensor in accordance with claim 8 in which a flexible diaphragm is carried by said housing transverse to the axis of said tube and against which the closed end of said bellows bears, and orifice-varying means carried by said diaphragm in confronting relation to said variable orifice.

11. In a temperature sensor, a housing having axially aligned openings in its end walls, a diaphragm in said housing carried by the side walls of said housing and disposed transverse to the axis of said openings, said diaphragm dividing the interior of said housing into first and second chambers, said first chamber having a fluid inlet including a fixed inlet orifice and a fluid outlet including an outlet orifice, said fluid outlet being formed in an axially adjustable member screw-threaded into one of said openings which is in said first chamber, a fluid pressure-responsive device in fluid communication with said first chamber for indicating pressure in terms of temperature, and expansible means responsive to temperature external of said housing including a tube of stainless steel having an open externally flanged end by which it is secured to an end wall of said housing with its open end over said other opening, an expansible bellows in said second chamber axially aligned with said tube having an externally flanged open end secured to said end wall over said other opening, said tube and said bellows having their remote ends closed, and a quartz rod in said tube having its ends in pressure engagement with the closed ends of said tube and bellows.

12. In a temperature sensor, a housing having fluid-inlet and fluid-outlet passageways, a piston rod and piston in said housing, said piston rod being piloted in said housing, an annular enlarged chamber in said housing adjacent said piston the extremities of which form spaced orifices with said piston, a pressure-responsive indicator in communication with said chamber, and temperature-responsive expansible means carried by said housing and axially aligned with said piston rod for moving said piston to vary said orifices, said temperature-responsive means including a stainless-steel tube having one end open and one end closed, said open end having an external flange for securing said tube to said housing with its open end over an opening in said housing, an expansible bellows in said housing having an open end and a closed end, said open end of said bellows having an external flange for securing said bellows to said housing over said opening, said bellows and said tube being axially aligned with said piston rod and the closed end of said bellows being in abutting engagement with said rod, and a quartz rod located in said tube having its opposite ends in pressure engagement with said closed ends of said bellows and tube.

References Cited in the file of this patent
UNITED STATES PATENTS

| | | |
|---|---|---|
| 2,606,445 | Eckman | Aug. 12, 1952 |
| 2,775,231 | Silver | Dec. 25, 1956 |